(12) United States Patent
McMurty et al.

(10) Patent No.: US 7,722,515 B2
(45) Date of Patent: May 25, 2010

(54) RACK AND MODULE CHANGE SYSTEM

(75) Inventors: David Roberts McMurty, Stancombe (GB); Geoffrey McFarland, Upper Cam (GB); Stephen James Trull, Wickwar (GB)

(73) Assignee: Renishaw plc, Wotton-under-Edge (GB)

( * ) Notice: Subject to any disclaimer, the term of this patent is extended or adjusted under 35 U.S.C. 154(b) by 181 days.

(21) Appl. No.: 10/497,915

(22) PCT Filed: Dec. 10, 2002

(86) PCT No.: PCT/GB02/05584
§ 371 (c)(1),
(2), (4) Date: Jun. 7, 2004

(87) PCT Pub. No.: WO03/053630
PCT Pub. Date: Jul. 3, 2003

(65) Prior Publication Data
US 2005/0014620 A1 Jan. 20, 2005

(30) Foreign Application Priority Data
Dec. 10, 2001 (GB) .................................. 0129471.9

(51) Int. Cl.
*B23Q 3/155* (2006.01)
(52) U.S. Cl. ............................ 483/59; 483/901; 483/16; 211/1.57; 211/70.6
(58) Field of Classification Search .................... 483/16, 483/54–55, 58, 65–66, 69, 900, 901, 59; 211/1.51, 1.57, 70.6; 901/41
See application file for complete search history.

(56) References Cited

U.S. PATENT DOCUMENTS

| 4,182,021 | A | * | 1/1980 | Kato et al. ..................... 483/59 |
| 4,349,946 | A | * | 9/1982 | McMurtry ...................... 29/57 |
| 4,604,787 | A | * | 8/1986 | Silvers, Jr. .................... 483/55 |
| 4,651,405 | A | * | 3/1987 | McMurtry .................... 483/10 |
| 4,688,307 | A | * | 8/1987 | Schneider et al. ............ 29/26 A |
| 5,018,266 | A |   | 5/1991 | Hutchinson et al. |
| 5,101,548 | A | * | 4/1992 | McMurtry et al. ............ 483/62 |

(Continued)

FOREIGN PATENT DOCUMENTS

EP   0 293 036 A2   11/1988

(Continued)

*Primary Examiner*—Erica E Cadugan
(74) *Attorney, Agent, or Firm*—Oliff & Berridge, PLC

(57) ABSTRACT

A module storage rack is disclosed e.g. a probe rack suitable for use with a carrier e.g. a probe measurement head which is movable relative to the rack for picking a module from the rack. The rack includes a base member and a plurality of storage ports connected to the base for storing the modules, each port has an actuatable connecting or disconnecting tool for connecting or disconnecting a module to or from the carrier, and each storage port is movable relative to the base member the relative movement provides the actuation of the tool. The plurality of storage ports are movable together relative to the base. Additionally, there is disclosed a linkage having a plurality of pivotally interconnected rigid members being connected to the tool for causing the tool to connect or disconnect the module to or from the carrier. The linkage may be operated by movement of the rack or by alternative mechanisms.

13 Claims, 6 Drawing Sheets

U.S. PATENT DOCUMENTS 5,327,657 A * 7/1994 Hajdukiewicz et al. ....... 33/503
7,024,783 B2 * 4/2006 Trull et al. .................... 33/503

FOREIGN PATENT DOCUMENTS

| EP | 0 856 377 A1 | 8/1998 |
| JP | U 59-156743 | 10/1984 |
| JP | A 02-502578 | 8/1990 |

* cited by examiner

Alternative embodiments wherein the driving mechanism is a solenoid or a pneumatic ram.

Fig. 6.

RACK AND MODULE CHANGE SYSTEM

This invention relates to a rack for supporting modules and a changing system for changing one module for another. In particular, but not exclusively, the invention relates to a module support rack for measurement probes and a system for disconnecting one probe from a carrier of a measurement machine, such as coordinate measuring machine or a machine tool, to which it is connected whilst the head is stationed at the rack and optionally connecting another probe to the head whilst the head is stationed at the rack.

When a selection of probes are required to perform a function e.g. the inspection of the dimensions of a workpiece, mounted to a coordinate measuring machine (CMM), then a rack can be used to support the measuring probes which are not in use. Desirably, for automation the changeover from one probe to another should be carried out without manual intervention. Such an operation has problems i.e. the need to automatically disconnect and then reconnect a probe in the rack.

One type of storage rack for measurement probes is shown in European Patent No. 0142373. A storage rack is shown having a plurality of ports each having a screwdriver blade which undoes a joint when a probe and head are moved into a port. Each blade is motorised and therefore the rack requires power and signal lines.

A similar storage rack is shown in European Patent No. 856377. In that document there is disclosed a rack (20 in FIG. 1) having one or more docking ports. Disconnection of a probe from the head which carries it is brought about by means of a disconnecting mechanism at each docking port in the form of a screwdriver blade which rotates and undoes a joint between the probe and head whilst the probe is supported in the rack.

The rack shown in EP 856377 is not powered. Instead, the head and probe move into a port, the head moves the port relative to the rack and this action causes the blade to undo the joint. Each port is movable separately and each port has its own discrete blade rotation mechanism. This means that the rack is expensive to produce.

According to one aspect of the invention there is provided a module storage rack suitable for use with a carrier which is movable relative to the rack for picking a module from the rack, the rack comprising:
 a base member;
 a plurality of storage ports connected to the base for storing the modules, each port having an actuatable connecting or disconnecting tool for connecting or disconnecting a module to or from the carrier, and each storage port being movable relative to the base member the said relative movement providing the actuation of the tool;
 characterised in that the said plurality of storage ports are movable together relative to the base.

The actuation mechanism for the tool described in EP856377 uses pulleys or cams and cables and is complicated and expensive to make.

According to a second aspect of the invention there is provided a module storage rack for mounting at a machine and suitable for storing modules which are connectable to a carrier of the machine movable relative to the rack, the rack comprising:
 at least one storage port having a tool for connecting or disconnecting the module to or from the carrier; characterised in that the rack further comprises a linkage having a plurality of pivotally interconnected rigid members being connected to the tool for causing the tool to connect or disconnect the module to or from the carrier.

Embodiments of this aspect of the invention thus provide a low-cost, easily manufacturable tool actuation mechanism, for a single storage port as well as for multiple storage ports.

In both aspects of the invention, the storage port or ports are preferably movable by the movement of the module carrier but according to the second aspect the linkage may be movable whilst the storage ports remain stationary.

Preferred embodiments of the invention will now be described with reference to the drawings, wherein.

Figure 1:
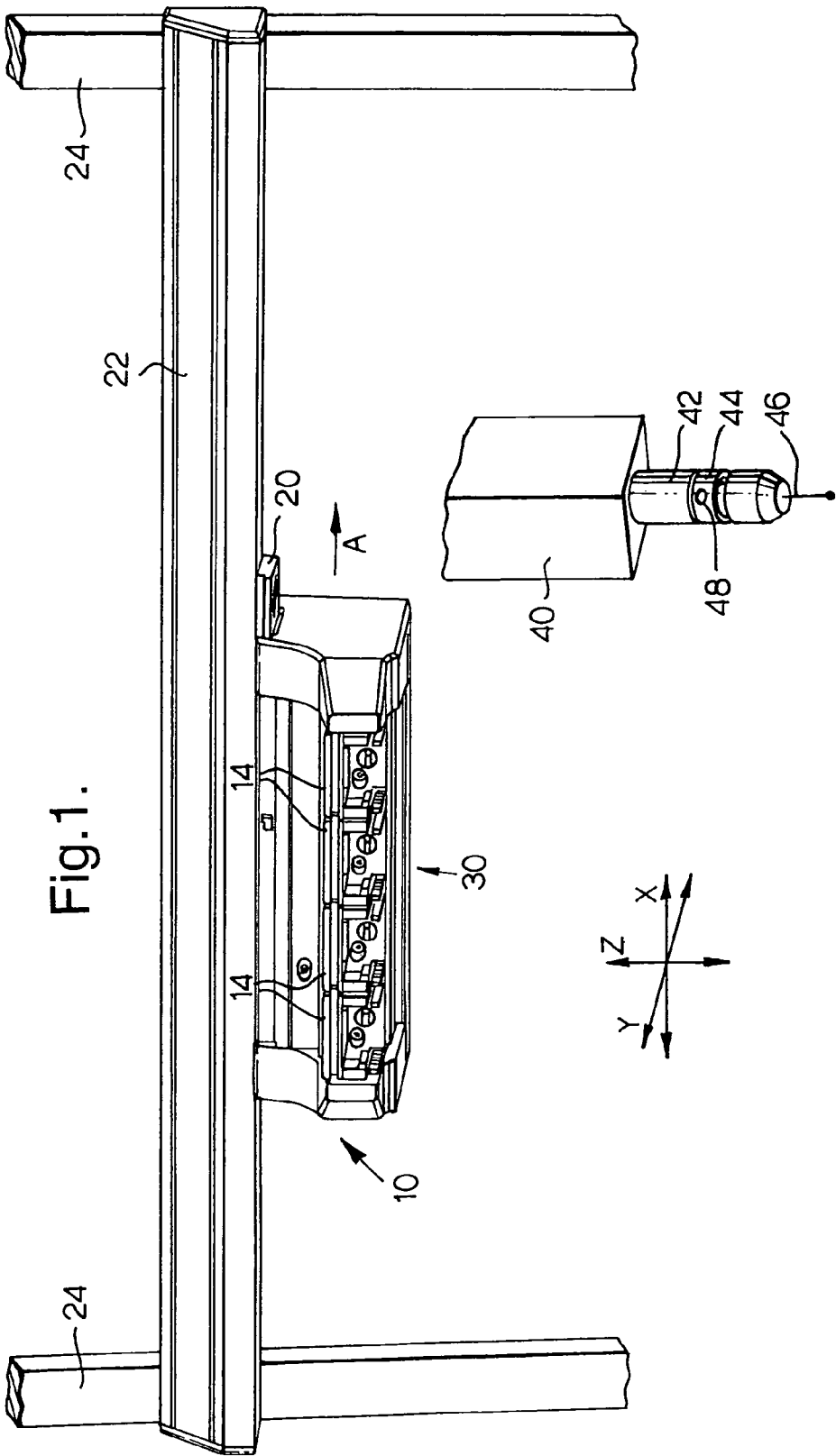
FIG. 1 shows a perspective view of an embodiment of the invention.
Figure 2:
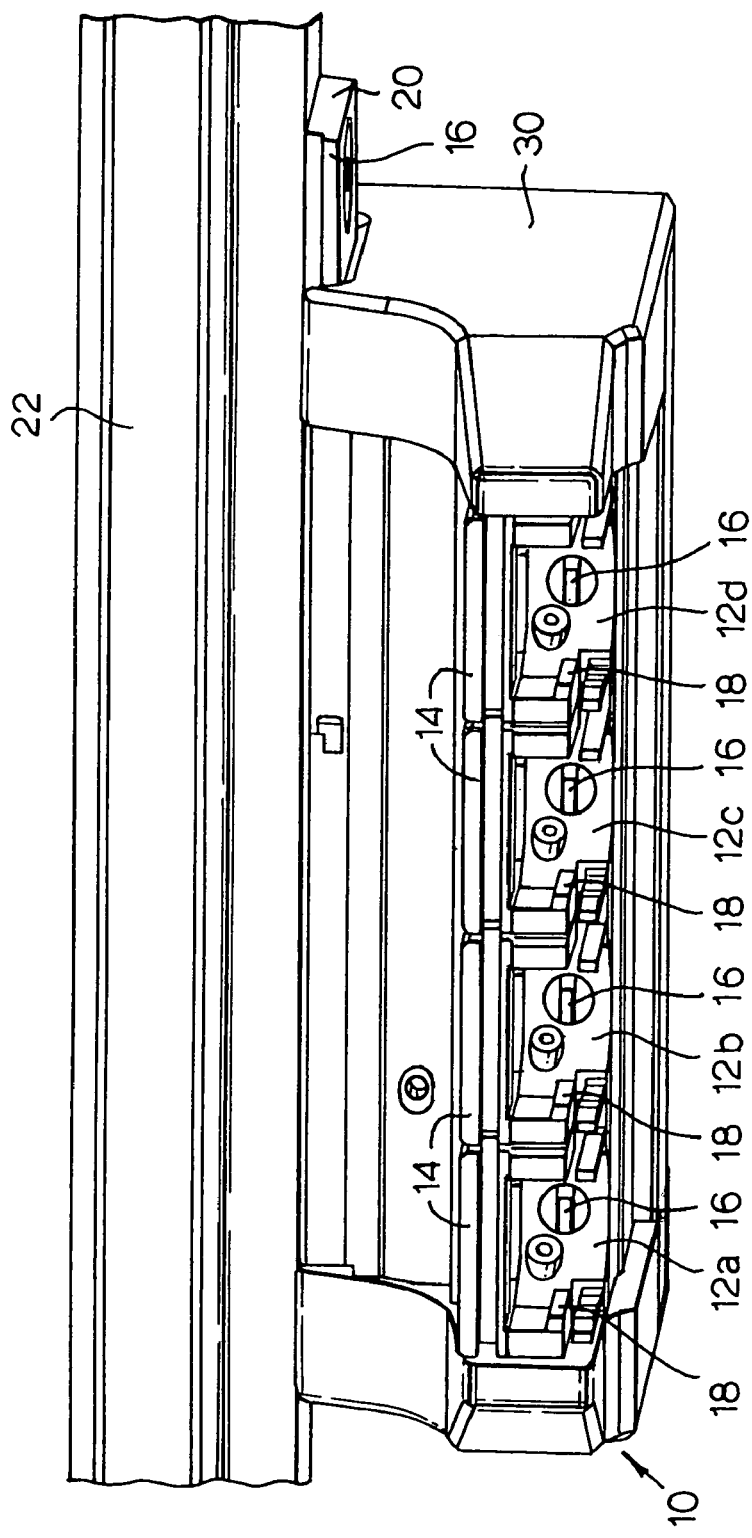
FIG. 2 shows an enlarged view of a portion of the embodiment shown in FIG. 1.
Figure 3A:
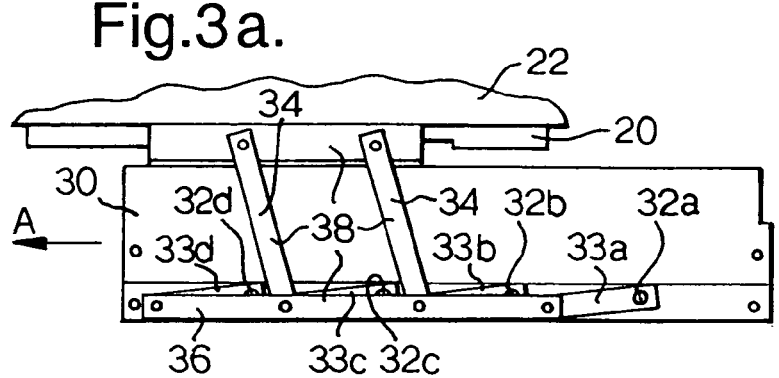
Figure 4A:
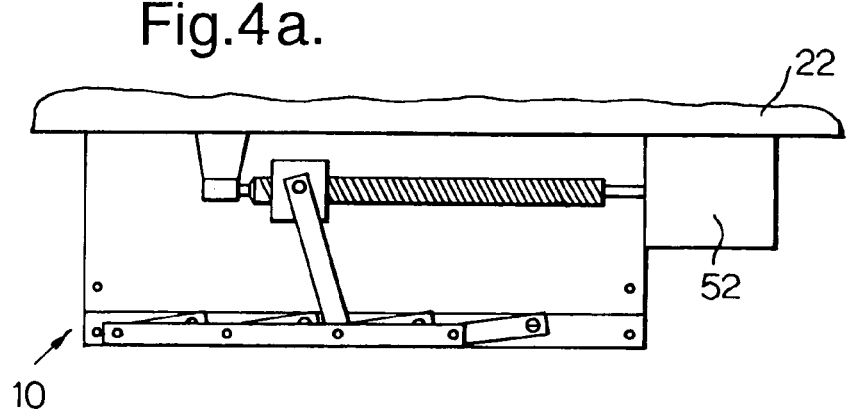
Figure 4B:
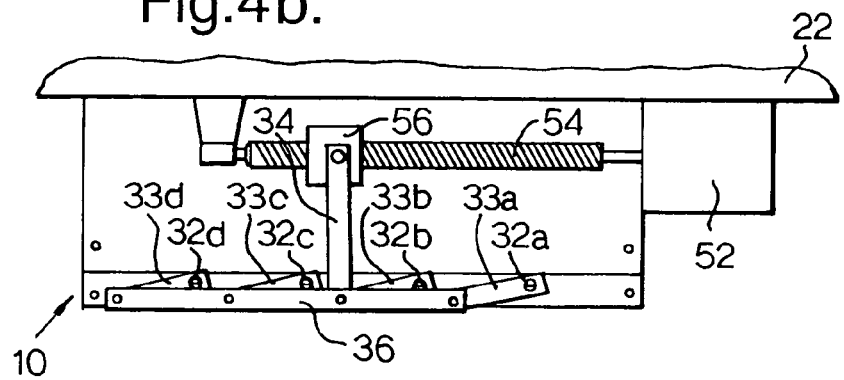
Figure 4C:
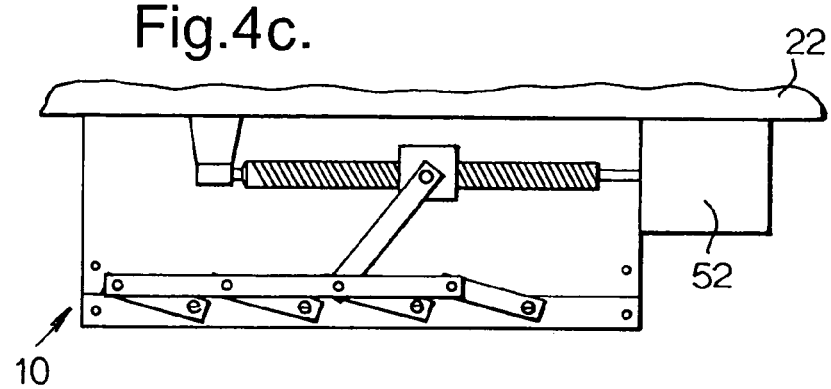
Figure 4D:
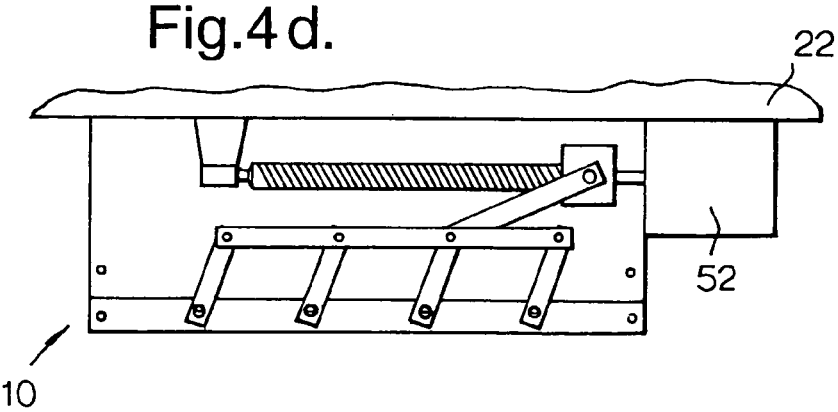
Figure 5A:
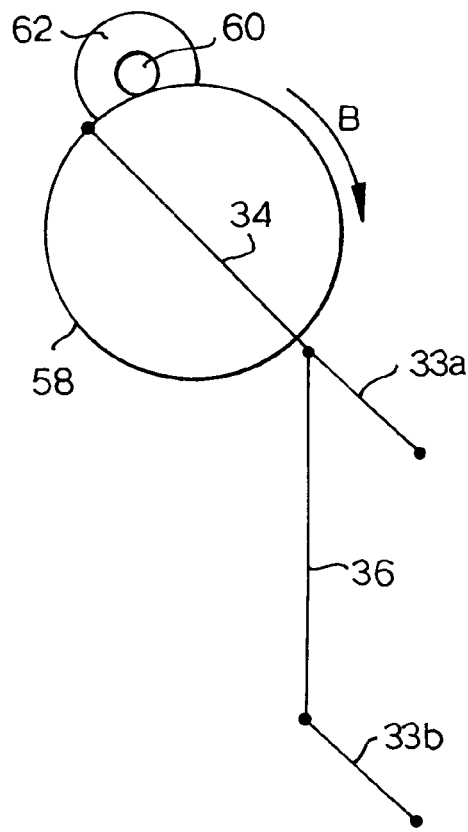

FIGS. 3a,b,c and d are views of a mechanism employed within the embodiment shown in FIGS. 1 and 2, in four different positions; and FIGS. 4a,b,c&d and FIGS. 5a&b show alternative embodiments of the invention FIG. 1 shows a storage rack 10 according to the invention. The rack comprises a fixed member 20 and a movable support 30 mounted on a slideway (26 FIG. 2) of the fixed member 20. The movable support is shown at one end of its travel and is movable in the lateral direction of arrow A. The fixed member 20 is shown secured to a beam 22 which is in turn secured to two uprights 24 mounted to a coordinate measuring machine (CMM) (not shown). The CMM has also a probe carrier quill 40 which is movable in directions X, Y and Z. Attached to the quill is a measurement probe head 42. Removably attached to the head is a measurement probe 44 and attached to the probe is a stylus unit 46. In order that the probe and stylus unit may be exchanged for a probe and stylus of a different configuration, it is possible to disconnect the probe from the head by turning a slot 48 through approximately 90°. The slot 48 is shown on the wrong side in FIG. 1, and in use will be in a diametrically opposed position.

Such a disconnectable joint is described fully in previous patent EP0142373 and its disclosure is incorporated herein by reference. For complete automation the disconnection action takes place at the rack 10 where one probe and stylus may be exchanged for another. Referring to FIGS. 1 and 2, in operation, the quill 40 moves towards the rack 10 and causes probe 44 to enter one of four ports 12a,b,c or d. In so doing, one of the four sprung probe protection lids 14 will be pushed out of the way. Once the probe has entered the port 12 its slot 48 will engage a connection and disconnection tool in the form of a screwdriver type blade 16. The quill, under CMM instruction will then be driven in the direction of arrow A for a predetermined distance. This action moves all four ports together and causes all their blades 16 to turn through approximately 90°. The blade 16 of the port into which the probe has just entered turns the slot 48 and undoes the joint which connects the probe to the head. The probe, when disconnected from the head, can rest in the rack supported on a ledge 18 (one of a pair of which is shown in each port).

The head is now free to move out of its port and on to another port and reconnect to another probe by moving in the reverse direction, thus causing the blade 16 of that port to turn in slot 48 in that other probe and thereby to make good the joint between the head and the other probe. Once secured the quill head and new probe can move away from the rack. The respective probe protection lid 14 will spring back over the top of the port when the head moves away.

Referring to FIGS. 3a-d, the mechanism by which the blade 16 is caused to rotate is shown in these Figures. The mechanism is housed at the back of the movable part 30 shown in FIGS. 1 and 2, and is connected to both the movable part 30 and the fixed member 20. The views of FIG. 3 are of the back of the support 30 shown in FIGS. 1 and 2. In use the mechanism is protected by a cover which is not shown in these Figures. Referring specifically to FIG. 3*a*, the relative position of the member 20 and support 30 is as they are depicted in FIGS. 1 and 2. Support 30 may move in the direction of arrow A. In so doing the various bar members of the mechanism are caused to move and rotate the blades 16 which are attached to spindles 32.

The mechanism shown in each of FIG. 3 comprises generally a plurality of pivotally interconnect rigid members, in this embodiment in the form of a parallel four-bar linkage 38 made up of two parallel bars 34 and a further two parallel bars formed, one at fixed member 20 and the other at tie-bar 36. Pivot pins rotatably connect the four bars.

To the tie-bar 36 are pivotally connected also four crank rods 33*a,b,c* and *d* each of which is rigidly connected to a respective spindle 32*a,b,c* and *d*.

Relative movement between the support 30 and the fixed member 20 causes the four-bar linkage 38 to move in a parallel manner and causes cranks 33 to rotate together with spindles 32. As mentioned above, relative movement is brought about by the driving action of the CMM quill 40 when a head 42 is located within a port 12. In this instance, movement of the mechanism from the position shown in FIG. 3*a* through the positions shown in FIGS. 3*b,c* and to the final position shown in FIG. 3*d* is carried out in one operation and undoes the head to probe joint. Movement in the reverse manner will reconnect the joint if the head and a probe are present in a port.

Figure 3B:
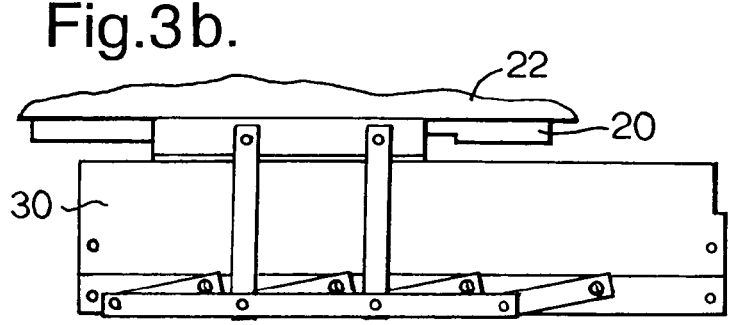
Figure 3C:
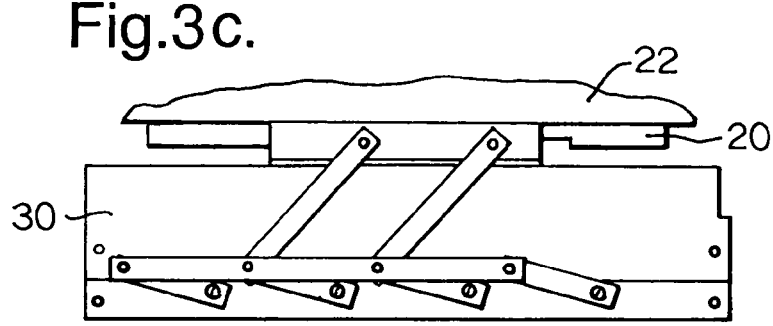
Figure 3D:
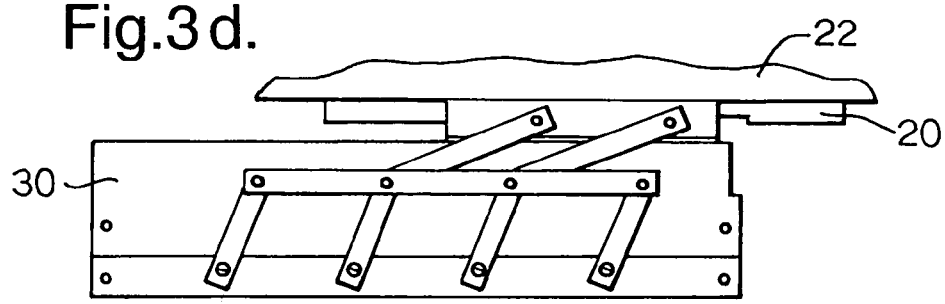

It will be noted that rotation of the spindles i.e. the rotation shown between the positions in FIGS. 3*a* and 3*b* is in the opposite direction to the rotation shown between the positions in FIGS. 3*b* and 3*d*. The reason for this is as follows:

When the quill is moving in the direction opposite to arrow A it may be locking the head 42 to a probe 44, and in so doing moves from the FIG. 3*d* position to the FIG. 3*b* position. Before the head and probe move away the blade 16 is moved into the centre of the probe slot 48 by the slight reverse rotation shown in FIG. 3*a*. This motion is accomplished will the rack is moving in one direction only and therefore control of the quill is simplified. This "backing-off" of the blade allows the probe to be withdrawn from its port with ease, and without dragging on the blade.

Another noteworthy aspect of the mechanism is the quill movement to spindle rotation ratio. The torque required to rotate the slot is greatest when the head to probe joint is in the fully locked position and is least when the joint is completely disconnected. So movement of the quill is converted into relatively large spindle rotation at the position of FIG. 3*d* but relatively small spindle rotation at the position of FIGS. 3*b* and 3*a*. The result of this change in quill movement to spindle rotational ratio reduces the side-loading on the quill when it locks the probe, because greater movement is required for a smaller rotation of the blade as the joint becomes closer to its fully locked position (FIGS. 3*b/c*).

It may be that one of the bars 34 may be omitted, it may be that fewer or more than four ports 12 may be employed and connection/disconnection may be other than by a screwdriver-type blade. It is possible that two or more supports 30 (each having a plurality of ports) may be fixed together, or held separately on beam 22.

Various items might be attachable to the head 42 (generically entitled "module(s) and "module carrier" respectively"), e.g. probe extension bars.

Alternatively a rack and pinion might be used to turn the linear sliding movement of the support 30 into rotation of the blades 16. Thus a rack might be provided on fixed member 20 and a pinion may be rotatably connected to the or each blade 16.

Another embodiment is shown in FIGS. 4*a,b,c&d*. In this embodiment the rack 10 is fixed relative to the fixed base 20. The linkage is movable in the same manner as described above, except that actuation of the spindles 32 *a,b,c&d* is by means of a motor 52. The motor rotates a screw thread 54 in both directions. This rotation causes a follower 56 to move along the thread and thus move bar 34. This action causes connection and disconnection of the probe from the head.

Figure 5B:
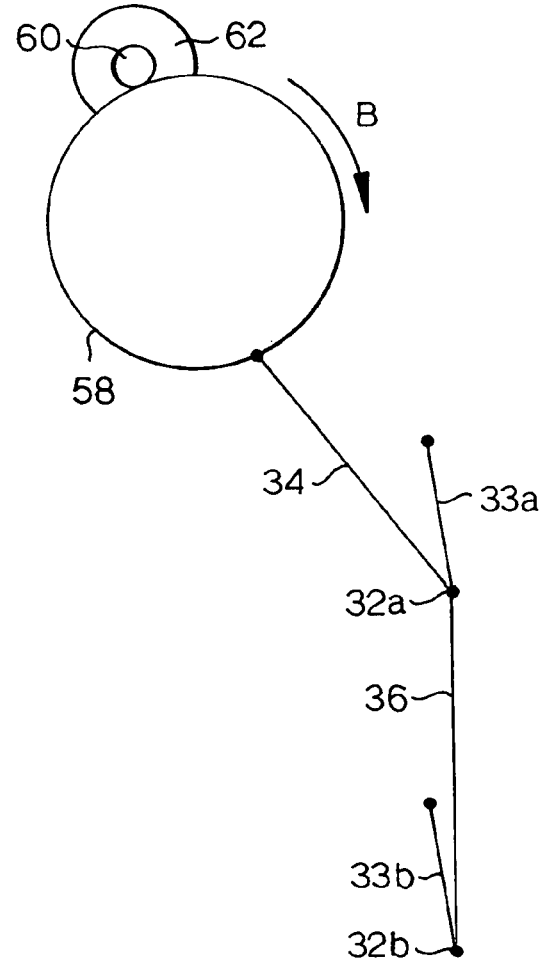

Yet another embodiment is show FIGS. 5*a&b*. In this embodiment (shown schematically) the rack and base (not shown) will be relatively stationary also. The screw and follower are replace by a crank 58. The crank is rotatable in the direction of arrow B from a disconnection position shown in FIG. 5*a* to a connection position shown in FIG. 5*b*. A motor 62 and drive gear 60 are used to rotate the crank in the direction of arrow B only without the need for reversing. Just two spindles 32 are illustrated for simplicity.

In the embodiments shown in FIGS. 4 and 5 the "backing off" mention above is accomplished as the drive mechanisms shown operate in one direction, without the need to reverse operation. As a result, again control of the mechanism is simplified. Whilst a screw and crank have been illustrated, other driving mechanisms are envisaged e.g a solenoid or a pneumatic ram.

Whilst the invention is described as having one type of probe connection mechanism it will be apparent that other methods of locking and unlocking the probe to the head could be used, e.g. the device employed in EP856377 might be used.

Whilst the invention is described and illustrated with reference to its use with a CMM and measuring probes, it will be apparent that many other applications are possible.

The invention clamed is:

1. A module storage rack suitable for use with a carrier which is movable relative to the rack for picking a module from the rack, the rack comprising:
   a base member;
   a plurality of storage ports connected to the base member for storing the modules, each storage port having an actuatable connecting or disconnecting tool for connecting or disconnecting a module to or from the carrier, and each storage port being linearly movable relative to the base member, the said linear movement providing the actuation of a respective tool;
   wherein said plurality of storage ports are linearly movable together relative to the base member.

2. A module storage rack as claimed in claim 1 wherein a tool actuation mechanism is provided for actuating all the tools of the storage ports.

3. A module storage rack as claimed in claim 2 wherein the tool actuation mechanism comprises a linkage of pivotally interconnected rigid members.

4. A module storage rack as claimed in claim 3 wherein the rigid members comprise a first member pivotally connected to the base member and a plurality of second members each pivotally connected at one end to the first member via a tie rod and each connected to the tool of a respective storage port at another end.

5. A module storage rack as claimed in claim 3, wherein the linkage causes rotation of the tools for causing said connecting or disconnecting and wherein the linkage is caused to rotate during said relative movement.

6. A module storage rack as claimed in claim 5 wherein the said rotation is firstly in one direction and secondly in the opposite direction and wherein the rotation in the said one direction is of a greater extent than the rotation in the said opposite direction.

7. A module storage rack for mounting at a machine and suitable for storing modules which are connectable to a carrier of the machine movable relative to the rack, the rack comprising:
- at least one storage port having a corresponding tool separate from the module and the carrier for connecting or disconnecting the module to or from the carrier,
- wherein the rack further comprises a linkage having a plurality of pivotally interconnected rigid members being connected to the tool for causing the tool to move relative to the storage port and to connect or disconnect the module to or from the carrier.

8. A module storage rack as claimed in claim 7 wherein a plurality of the storage ports are provided and a tool actuation mechanism is provided for actuating each of the tools of the storage ports.

9. A module storage rack as claimed in claim 7 further comprising a base member and wherein the rigid members comprise a first member pivotally connected to the base member, and a plurality of second members each pivotally connected at one end to the first member via a tie rod and each connected to the tool of a respective storage port at another end.

10. A module storage rack as claimed in claim 7, 8 or 9 wherein the linkage causes rotation of the tool for causing the said connecting or disconnecting and wherein the linkage is caused to rotate during relative movement of the or each storage port relative to the base member.

11. A module storage rack as claimed in claim 10 wherein the said rotation is firstly in one direction and secondly in the opposite direction and wherein the rotation in the said one direction is of a greater extent than the rotation in the said opposite direction.

12. A module storage rack as claimed in claim 7 wherein the linkage causes rotation of the tool for causing the said connecting or disconnecting and wherein the linkage is caused to rotate by the movement of a driving mechanism connected to one end of the linkage.

13. A module storage rack as claimed in claim 12 wherein the driving mechanism comprises a screw thread and threaded follower, a crank, a solenoid or a pneumatic ram.

* * * * *